United States Patent [19]
Lee

[11] Patent Number: 5,479,307
[45] Date of Patent: Dec. 26, 1995

[54] AUDIO HEAD POSITION ADJUSTING DEVICE FOR A VIDEO CASSETTE RECORDER

[75] Inventor: Hyun-Moo Lee, Incheon, Rep. of Korea

[73] Assignee: Daewoo Electronics Co., Ltd., Seoul, Rep. of Korea

[21] Appl. No.: 271,597

[22] Filed: Jul. 7, 1994

[30] Foreign Application Priority Data

Jul. 15, 1993 [KR]  Rep. of Korea ..................... 93-13071

[51] Int. Cl.⁶ ..................................................... G11B 5/56
[52] U.S. Cl. ............................................................ 360/109
[58] Field of Search .................................. 360/104, 106, 360/109

[56] References Cited

U.S. PATENT DOCUMENTS

| | | | |
|---|---|---|---|
| 4,422,116 | 12/1983 | Cap | 360/109 |
| 4,833,558 | 5/1989 | Baheri | 360/109 |
| 5,055,956 | 10/1991 | Kaya et al. | 360/109 |
| 5,175,659 | 12/1992 | Yamanaka | 360/109 |

FOREIGN PATENT DOCUMENTS

| | | | |
|---|---|---|---|
| 4-186514 | 7/1992 | Japan | 360/109 |
| 4-241219 | 8/1992 | Japan | 360/109 |
| 6-44542 | 2/1994 | Japan | 360/109 |

Primary Examiner—Robert S. Tupper
Assistant Examiner—Brian E. Miller
Attorney, Agent, or Firm—Anderson Kill Olick & Oshinsky

[57] ABSTRACT

An audio head position adjusting device for use in a video cassette recorder comprises a support plate rotatably mounted on a deck of the recorder, and a mounting plate resiliently supported on the support plate and carrying an audio head thereon. The mounting plate is associated with the support plate by azimuth adjusting screws which is used to adjust a vertical position of the audio head and by a tilt adjusting screw which is used to adjust an inclined position of the audio head. The support plate is provided with a horizontal adjusting mechanism at its middle portion, which is adaptive to adjust the audio head in a horizontal direction. The horizontal adjusting mechanism includes toothed lugs provided at an opening of the middle portion of the support plate, and an adjusting knob engaged with the toothed lugs of the support plate and rotatably held in a recessed groove of the deck.

2 Claims, 3 Drawing Sheets

AUDIO HEAD POSITION ADJUSTING DEVICE FOR A VIDEO CASSETTE RECORDER

FIELD OF THE INVENTION

The present invention relates to an audio head position adjusting mechanism; and, more particularly, to a device for adjusting the position of an audio head of a video cassette recorder ("VCR"), capable of positioning the audio head in a required vertical, tilt or horizontal location to maintain the audio head in a predetermined contact relationship with a video tape loaded in the VCR.

DESCRIPTION OF THE PRIOR ART

As is well known in the art, a VCR comprises a head drum for recording and reproducing video information on and from a video tape and an audio head for recording and reproducing audio information on and from the video tape. Generally, the audio head is spaced from the head drum at a predetermined distance; however, in order to record or reproduce audio information on or from the tape with accuracy, the audio head must be located to be in contact with the video tape during the operation of the VCR. Accordingly, in recent years, the VCR is provided with an adjusting mechanism which serves to position the audio head at a required horizontal or vertical direction with respect to the head drum while maintaining a proper contacting relationship between the tape and the audio head.

In this regard, there have been proposed various devices for adjusting the position of the audio head. For example, UK Patent Publication No. 2 221 338 discloses a position adjusting device for an audio head, which comprises a main base plate, a support shaft mounted uprightly on the base plate, a head mounting plate supported around the shaft and carrying an audio head thereon, a resilient member for biasing the mounting plate in an axial direction and a circumferential direction around the shaft, a vertical position adjusting nut screwed on the shaft, and a horizontal adjusting mechanism having an inclined stopper element provided on the base plate and a horizontal position adjusting screw engaged with the base plate. However, this device has a disadvantage in that the running tape may be subject to damages during the operation of the VCR as the horizontal adjusting mechanism is closely disposed and exposed adjacent to a path of the tape in the base plate. Further, the adjusting device consists of numerous parts, requiring extra assembling processes thereof.

A typical audio head adjusting mechanism commonly employed in the industry is shown in FIG. 1. The adjusting device includes an upright support bolt 2 fixed to a deck 4, and a main plate 6 swingably pivoted at the support bolt 2. The main plate 6 is biased upward on the deck 4 by a torsion spring 8 which is disposed around the bolt 2. A mounting plate 10 is attached on the main plate 6 by a tilt adjusting screw 12 and two azimuth screws 14 (only one is shown) and also biased upward on the main plate 6 by coil springs 16 which are seated around the azimuth screws 14. An audio head 18 is secured on the mounting plate 10.

A cylindrical sleeve 20 is fitted on the support bolt 2 and fixed to the mounting plate 10. A vertical position adjusting nut 22 is engaged with an upper portion of the support bolt 2 and contacts with the top surface of the sleeve 20. A tapered nut 24 is threadedly engaged with a bolt 26 which is rigidly secured to the deck 4. The tapered nut 24 is positioned in contact with a side surface of the main plate 6.

According to the adjusting mechanism of the prior art, for example, in case of adjusting the vertical position of the audio head 18, a clockwise or counterclockwise rotation of the adjusting nut 22 causes the main plate 6 associated with the mounting plate 10 to move downward against the biasing force of the torsion spring 8 or upward by the restoring force of the torsion spring, thereby achieving the vertical adjustment of the audio head 18. In addition, the tilt position of the audio head 18 is adjusted by the tightening or loosening of the tilt adjusting screw 12 threadedly engaged with the mounting plate 10. Further, the main plate 6 is biased counterclockwise by the torsion spring 8 to contact with the tapered nut 24 so that it is rotated in the horizontal direction about the support bolt 2 by the upward and downward movement of the tapered nut 24 along the bolt 26 to thereby adjust the horizontal position of the audio head 18 carried on the mounting plate 10.

As discussed above, the prior art adjusting device consists of a number of parts for adjusting the vertical, horizontal and tilt position of the audio head, thereby requiring rather complicated and costly manufacturing processes thereof and occupying a relatively large space on the deck. Also, the tapered nut is located in close to a path of a video tape in the deck, which may cause damages to the tape during the position adjustment of the audio head and/or the operation of the VCR.

SUMMARY OF THE INVENTION

Accordingly, it is an object of the present invention to provide an audio head position adjusting device for use in a VCR, which is designed to prevent a loaded magnetic tape from contacting with any part of the device to avoid any damages to the tape during the position adjustment of the audio head or the operation of the VCR.

It is another object of the present invention to provide a compact adjusting device for positioning an audio head in a required orientation, capable of minimizing its occupying space on a deck of a VCR.

It is a further object of the present invention to provide an audio head position adjusting device for a VCR which can be manufactured at a substantially low cost by simplifying the structure thereof.

The above and other objects of the present invention are accomplished by providing an audio head position adjusting device for a video cassette recorder, which comprises:

a support plate rotatably mounted on a deck of the recorder;

a mounting plate resiliently supported on said support plate and carrying the audio head thereon;

azimuth adjusting screws engaged with said mounting plate and said support plate for adjusting a vertical position of the audio head carried on the mounting plate;

a tilt adjusting screw coupled to said mounting plate and said support plate for adjusting an inclined position of the audio head in a forward and a backward directions with respect to the support plate; and means provided at a middle portion of the support plate for adjusting a horizontal position of the audio head.

In another aspect of the present invention, the support plate includes a pair of bent flanges formed at opposite sides thereof. One of the flanges is rotatably mounted on the deck by a pivotal bolt which serves as a pivotal axis in the horizontal position adjustment of the audio head. In addition, the other flange is provided with a curved slot through which a bolt passes to threadedly engage with the deck, thereby enabling the support plate to rotate in the horizontal direction (i.e., clockwise and counterclockwise) about the pivotal axis.

In accordance with a preferred embodiment of the present invention, the horizontal position adjusting means comprises toothed lugs provided in a first opening formed at the middle portion of the support plate, and an adjusting knob having a projecting portion provided on a shaft thereof and engaged with the toothed lugs of the support plate. The mounting plate is provided with a second opening corresponding to the first opening of the support plate, through which the shaft of the adjusting knob passes so as to be rotatably held in a recessed groove of the deck. Therefore, the rotation of the adjusting knob will cause the support plate to move in a required horizontal direction about the pivotal bolt, thereby adjusting the horizontal position of the audio head. After the completion of the horizontal adjustment of the audio head, the knob may be preferably removed from the deck of the VCR, reducing the occupying space of the adjusting device on the deck.

BRIEF DESCRIPTION OF THE DRAWINGS

The above and other objects, features and advantages of the present invention will become apparent from the following detailed description given in conjunction with the accompanying drawings, in which.

DETAILED DESCRIPTION OF THE PREFERRED EMBODIMENTS

Figure 1:
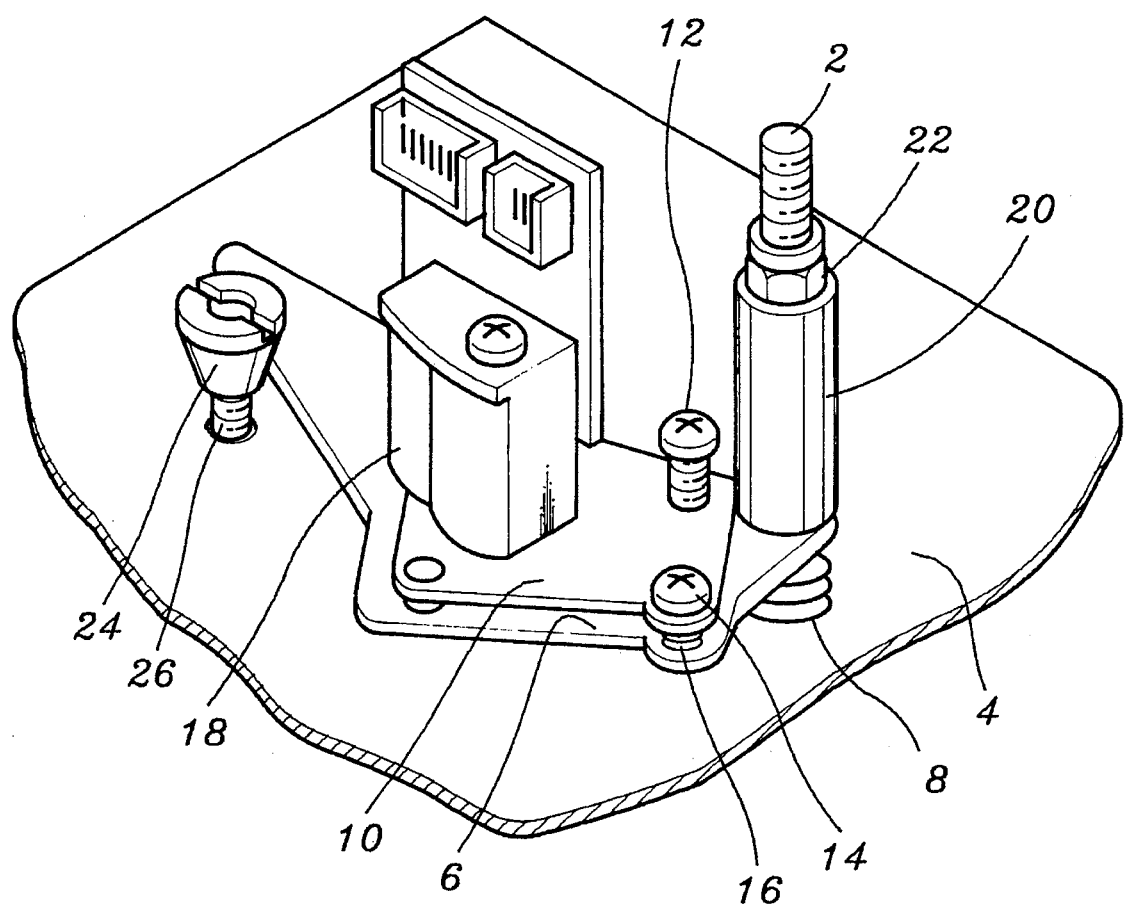
FIG. 1 is a perspective view of a prior art device for adjusting the position of an audio head for a VCR.
Figure 2:
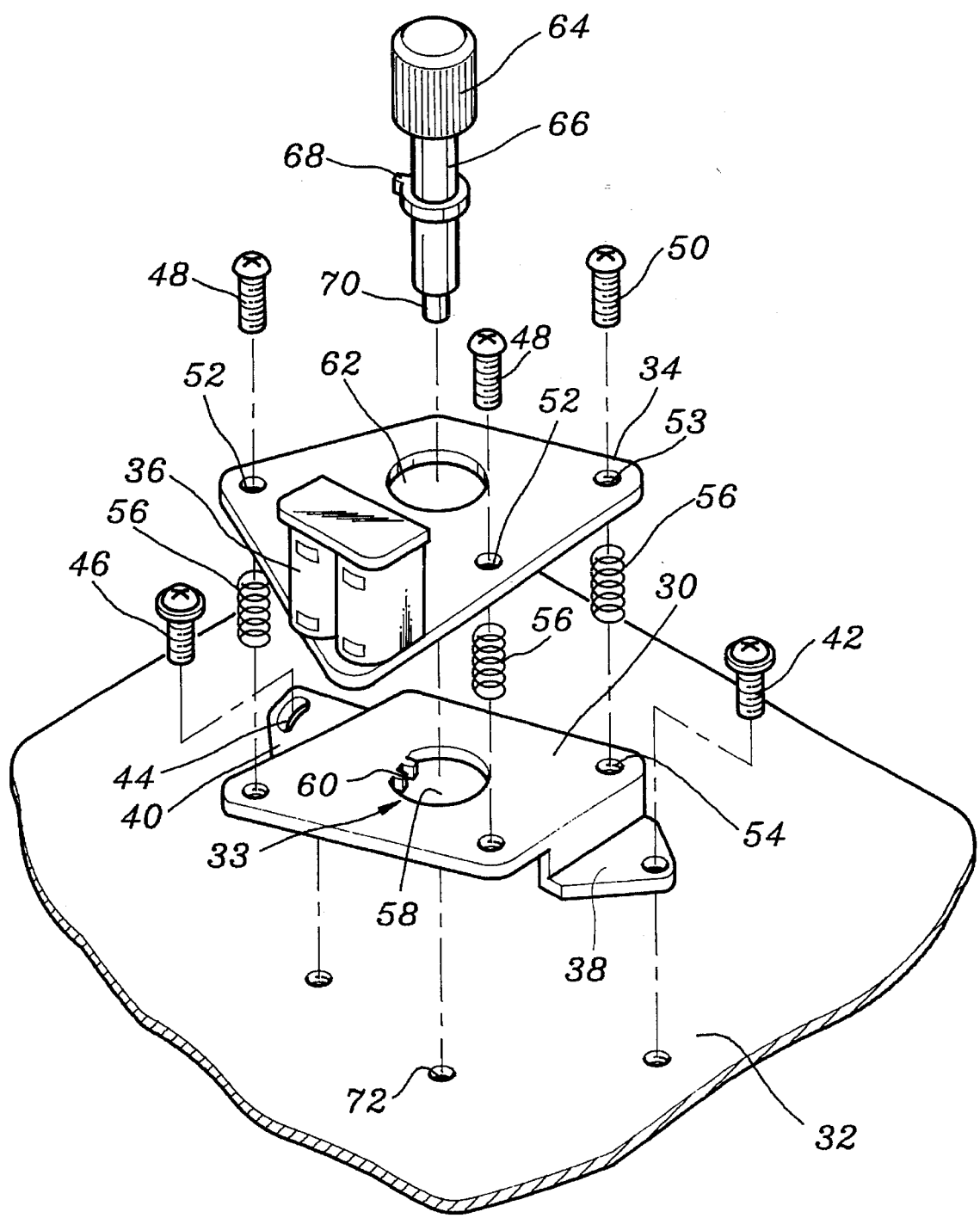
FIG. 2 is an exploded view of an audio head position adjusting device for a VCR in accordance with a preferred embodiment of the present invention.

Referring now to FIG. 2, there is shown an audio head position adjusting device for use in a VCR in accordance with a preferred embodiment of the present invention, with its parts being individually scattered for clarity. The adjusting device comprises a support plate 30 rotatably mounted on a deck 32 of the VCR, and a mounting plate 34 resiliently supported on the support plate 30 and carrying an audio head 36 thereon.

As shown in FIG. 2, the support plate 30 is provided with bent flanges 38, 40 formed at opposite sides thereof, one of which is rotatably engaged with a pivotal bolt 42 threadedly secured to the deck 32 and the other of which includes a curved slot 44 provided therein suitable for accommodating a bolt 46 threadedly fixed to the deck 32. The curved slot 44 of the flange 40 serves to allow the support plate 30 to rotate clockwise and counterclockwise about the pivotal bolt 42 in a horizontal position adjustment of the audio head 36. In addition, the bolts 42, 46 have the function for clamping the flanges 38, 40 of the support plate 30 to the deck 32. Also, provided at a middle portion of the support plate 30 is an adjusting means 33 for positioning the audio head 36 in the horizontal direction with respect to a head drum of the VCR(not shown) as will be further described hereinbelow.

The mounting plate 34 is associated with the support plate 30 by azimuth adjusting screws 48 and a tilt adjusting screw 50. The azimuth adjusting screws 48 pass through holes 52 of the mounting plate 34 and are threadedly engaged with the support plate 30. The tilt adjusting screw 50 is coupled to a threaded hole 53 of the mounting plate 34 and held in a recess 54 of the support plate 30. Further, interposed between the support plate 30 and the mounting plate 34 are resilient members 56, e.g., coil springs, which are inserted around the azimuth adjusting screws 48 and the tilt adjusting screw 50, respectively. Therefore, the mounting plate 34 is biased upward by the coil springs 56, thereby enabling the audio head 36 carried thereon to be adjusted in a required upward, downward or tilt orientation by the tightening and/or loosening of the individual screws 48, 50 as will be described in detail hereinbelow.

As discussed above, in accordance with a preferred embodiment of the present invention, the support plate 30 is provided with the horizontal position adjusting means 33 which comprises an opening 58 formed at the middle portion of the support plate 30 and toothed lugs 60 provided at the opening 58. The mounting plate 34 is provided with an opening 62 which corresponds to the opening 58 of the support plate 30 and is arranged in a coaxial relationship with each other. The horizontal position adjusting means 33 includes an adjusting knob 64 associated with the toothed lugs 60, which is adapted to rotate the support plate 30 in the horizontal direction about the pivotal bolt 42. The adjusting knob 64 has a shaft 66 suitable for passing through the openings 62, 58 of the mounting and the support plates 34, 30, and a projecting portion 68 provided on the shaft 66 and engaged with the toothed lugs 60 of the support plate 30. A tip portion 70 of the shaft 66 is rotatably held in a recessed groove 72 of the deck 32. As described above, the horizontal position adjusting parts are provided at the middle portion of the support plate 30 to prevent them from contacting with a loaded magnetic tape (T) (see FIGS. 3 and 4) during the position adjusting of the audio head 36 or the operation of the VCR. This results in the protection of the tape from contact damages. Further, the provision of the horizontal adjusting parts at the middle portion of the support plate 30 makes the configuration of the adjusting device more simplified and compact.

In accordance with a preferred adjusting device of the present invention, the procedure of adjusting the position of the audio head will now be described hereinbelow, with reference to FIGS. 2 to 4. In order to adjust the vertical position of the audio head 36, for instance, the tightening of the adjusting screws 48, 50 causes the mounting plate 34 to move downward against a biasing force of the coil springs 56, thereby adjusting the audio head 36 in the vertically downward direction to register it with a predetermined vertical position of the loaded magnetic tape (see FIGS. 3 and 4). In contrast, loosening of the adjusting screws 48, 50 will cause the mounting plate 34 to move in the upward vertical direction due to a restoring force of the coil springs 56, with the audio head 36 being adjusted in a required upward position.

On the other hand, a tilt position of the audio head 36 to the magnetic tape (T) can be adjusted by the clockwise or counterclockwise rotation of the tilt adjusting screw 50. That is, the loosening of the tilt adjusting screw 50, for example, enables the mounting plate 34 to be inclined in a forward direction about the azimuth screws 48 by the restoring force of the coil spring 56 inserted around the tilt adjusting screw 50, adjusting the tilt position of the audio head 36, and vice versa. If required, the audio head 36 can be inclinedly adjusted in a left and a right directions along a length of the magnetic tape by the tightening and the loosening of one or both of the azimuth screws 48.

Figure 3:
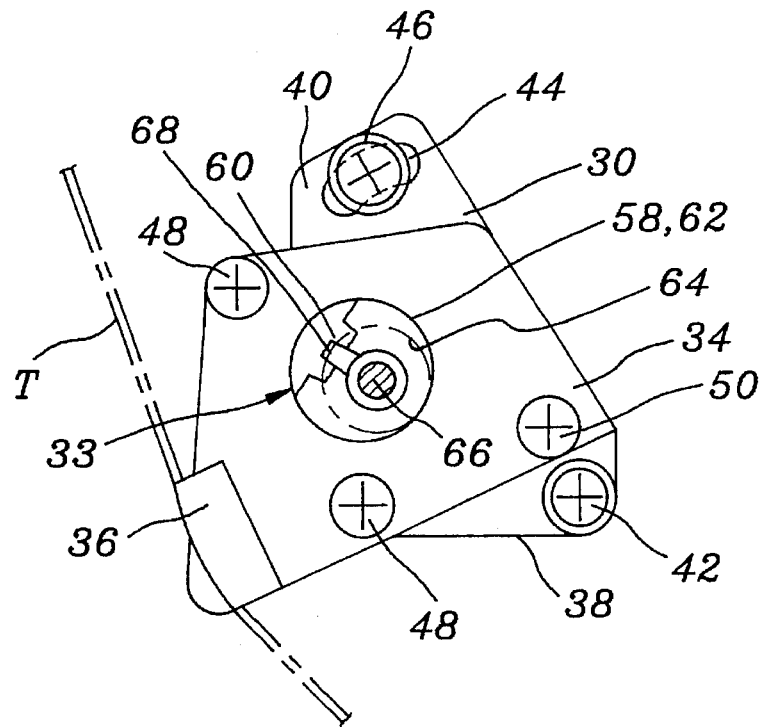
FIG. 3 is a plan view of the assembled audio head position adjusting device of FIG. 1 and shows, e.g., an initial position of the audio head.
Figure 4:
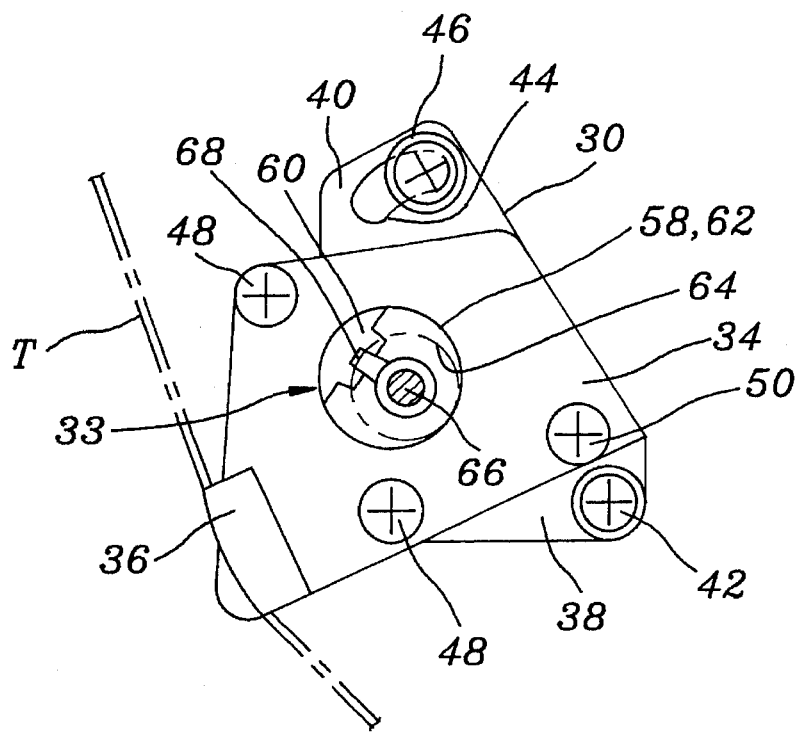
FIG. 4 is a view similar to that of FIG. 3, but illustrates the audio head finely rotated in the counterclockwise direction by an adjusting knob of the device shown in FIG. 2.

Further, in connection with the horizontal adjustment of the audio head 36, FIG. 3 shows an initial horizontal position of the audio head 36, while FIG. 4 depicts an adjusted horizontal position of the audio head 36 (the head 36 is oriented in the counterclockwise direction). In case of adjusting the horizontal position of the audio head 36 with respect to the head drum (not shown), with the clockwise or counterclockwise rotation of the adjusting knob 64, the support plate 30 is rotated in the clockwise or counterclockwise direction about the pivotal bolt 42 together with the mounting plate 34 incorporated therewith to thereby adjust the horizontal position of the audio head 36 carried on the mounting plate 34 in a required horizontal direction. After the horizontal position adjustment of the audio head 36 has been completed, the adjusting knob 64 may be preferably removed from the deck 32 of the VCR to reduce an occupying space of the adjusting device on the deck.

Although the invention has been shown and described with respect to the preferred embodiments, it will be understood by those skilled in the art that certain changes and modifications may be made without departing from the spirit and scope of the invention as defined in the following claims.

What is claimed is:

1. An audio head position adjusting device for a video cassette recorder, which comprises:

a support plate including two bent flanges formed at opposite sides of the support plate, one of the flanges being rotatably coupled to a pivotal bolt threadedly secured to a deck of the recorder, the other of the flanges having a curved slot for accommodating a bolt threadedly engaged with the deck to allow the support plate to rotate in a horizontal direction about the pivotal bolt;

a mounting plate resiliently supported on said support plate and carrying an audio head thereon;

azimuth adjusting screws engaged with said mounting plate and said support plate for adjusting a vertical position of the audio head carried on the mounting plate;

a tilt adjusting screw coupled to said mounting plate and said support plate for adjusting an inclined position of the audio head in a forward and a backward direction with respect to the support plate; and means provided at a central area of the support plate for adjusting a horizontal position of the audio head, said horizontal position adjusting means including a first opening formed at the central area of the support plate, toothed lugs provided at the first opening of the support plate, a second opening formed at the mounting plate and arranged in a substantially coaxial relationship with the first opening, and an adjusting knob passing through the first and the second openings and having and projecting portion engaged with the toothed lugs of the support plate.

2. The adjusting device of claim 1, wherein said adjusting knob is removably held in a recessed groove of the deck at its tip portion.

* * * * *